March 24, 1970 P. J. STAEBLER 3,502,924
HIGH SPEED ROTOR FOR DYNAMOELECTRIC MACHINE HAVING LAMINATIONS
WELDED TO STEPPED SHAFT AND METHOD OF MAKING THE SAME
Filed June 27, 1968
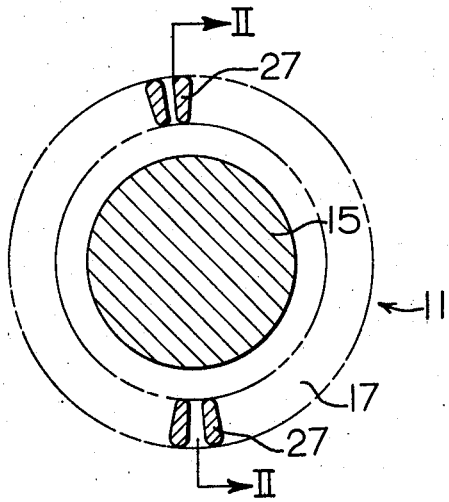
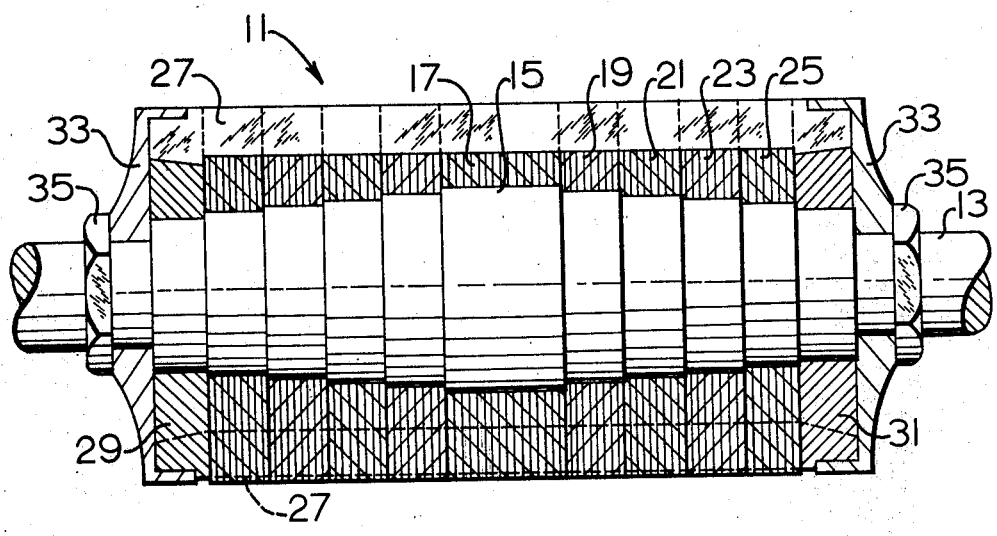
INVENTOR
PAUL J. STAEBLER
BY
ATTORNEYS

United States Patent Office 3,502,924
Patented Mar. 24, 1970

3,502,924
HIGH SPEED ROTOR FOR DYNAMOELECTRIC MACHINE HAVING LAMINATIONS WELDED TO STEPPED SHAFT AND METHOD OF MAKING THE SAME
Paul J. Staebler, Peoria, Ill., assignor to Caterpillar Tractor Co., Peoria, Ill., a corporation of California
Filed June 27, 1968, Ser. No. 740,697
Int. Cl. H02k 1/06, 1/28, 3/06
U.S. Cl. 310—211                6 Claims

ABSTRACT OF THE DISCLOSURE

A high speed rotor for a dynamoelectric machine of stepped shaft construction to which correspondingly sized laminations are electron beam welded.

---

This invention relates to a high speed laminated rotor that is capable of running at speeds between 15,000 and 22,500 r.p.m. without disintegrating by employing a bond between the laminations and a central shaft that is equal in strength to the parent materials.

In many applications it has proven to be economically or physically impossible to design a 4-pole induction motor to be physically small enough to be mounted in the space available. On the other hand, a 2-pole induction mtor is much smaller than the 4-pole motor and can be placed in a much smaller mounting area. In order to match the torque and power characteristics of a 4-pole motor using the same power source, the 2-pole motor is required to operate at considerably higher speeds and the final drive reduction ratio increased to allow desired output speed.

In order to accomplish this, the 2-pole induction motor must be capable of being run at speeds between 12,000 and 15,000 r.p.m. and, allowing a 50% over-speed factor, must be capable of operation up to approximately 22,500 r.p.m. Such speeds, particularly the over-speed condition cannot be achieved with convential induction motor rotor construction because the centrifugal forces would rise to the point of rotor disintegration. Rotor constructions in commercially available, large squirrel cage motors employ methods of attaching laminations to a shaft in which a press fit, key, or dovetail is used to maintain the laminations in register. The highest stress is at the point where the inner diameter of the laminations contacts the outer diameter of the shaft since there is no physical bond between the laminations and the shaft.

Therefore, it is proposed by this invention to form a physical bond between the laminations and the shaft by means of electron beam welding or other suitable bond forming method. This in turn causes a relocation of the point of greatest stress from the shaft outer diameter and lamination inner diameter interface to the axis of the shaft, thereby permitting higher rotational speeds to be achieved without disintegration.

Therefore, it is an object of this invention to provide a squirrel cage induction motor rotor capable of being driven at greater speeds than those rotors presently known and a method of forming the rotor.

It is also an object of the present invention to relocate the point of maximum stress in such a rotor from the juncture of the lamination inner diameter and shaft outer diameter to the center of the shaft.

It is a further object of this invention to provide a rotating laminated member that is capable of speeds up to approximately 22,500 r.p.m. without disintegrating by employing a bond between the laminations and the central shaft that is of a strength equal to that of the parent materials.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles.

It is recognized that other embodiments of the invention utilizing the same or equivalent principles may be used and structural changes may be made as desired by those skilled in the art without departing from the present invention and the purview of the appended claims.

BRIEF DESCRIPTION OF THE DRAWINGS

FIGURE 1 is an end view of one lamination in the central group of laminations as shown in FIGURE 2; and FIGURE 2 is a sectional view of the complete rotor assembly taken along a line II—II of FIGURE 1.

DESCRIPTION OF THE PREFERRED EMBODIMENT

In the configuration shown, a high speed squirrel cage rotor is indicated generally at 11 having a shaft 13 machined to provide a center section of large diameter 15 and sections of progressively smaller diameters extending in both directions from the center section. The shaft is stepped in the manner shown to enable the use of an electron beam welder at the interface of the shaft outer diameter and the inner diameter of the laminations in order to provide a complete bond between the laminations and the shaft. The capabilities of beam welders, insofar as maximum depth of weld penetration is concerned, dictate that the shaft be stepped to permit welding of group laminations in succession since most commercially known beam welders have insufficient penetration to extend a weld the full length of the squirrel cage rotor. Of course, if a welder or other bonding means exist with such capability, the stepping of the shaft would be unnecessary. In the configuration shown, the beam is applied from either side of the lamination group 17 with the beam directed axially along the interface of the parts while the shaft is rotated and that group of laminations is bonded to the shaft.

When the center section of laminations 17 is secured by welding, smaller lamination groups 19, 21, 23, and 25 are successively placed over the shaft and are similarly axially welded to the shaft. The process is then repeated for the opposite end of the rotor so as to complete the bonding of all laminations to the shaft.

The number of steps in the shaft and thus the number of welding steps required to complete the operation will depend upon the capaility of the available electron beam welder. In a rotor having an overall outer diameter of 8⅛ inches and a length of 15⅛ inches, the design parameters of a commercially available electron beam welder allows the welding operation to be accomplished in a total of ten steps starting at the center section 17 and extending in both directions.

When the laminations are secured to the shaft, rotor bars 27 are installed in slots provided and are joined to end rings 29 and 31 to complete the rotor electrical circuit in a conventional manner. The rotor bars and end rings are of low resistance, electrically conductive material and may be conventionally fabricated and installed separately and joined by brazing or other suitable means, or the rotor bars and end rings may be cast integrally with the rotor.

Since the rotor bars and end rings are of low resistance, electrically conductive material, it is necessary that some means be provided to counteract the centrifugal forces associated with high speed operation in order to prevent disintegration of those parts where they extend beyond the limits of the restraint provided by the rotor slots. For this purpose, two circular, cup-shaped members 33 of high strength steel are shown to fit over end rings 29 and 31. The protective members may be secured to the rotor by any suitable means such as retaining nuts 35.

Thus, the applicant has provided an improved high speed rotor wherein the point of greatest stress is transferred from the junction of the laminations with the rotor shaft to the axis of the rotor shaft thereby allowing greater speeds without disintegration of the rotor.

Having described the preferred embodiment of this invention, it must be understood that it is not to be limited to the precise details shown, but rather to the full range of coverage delineated by the following claims.

What is claimed is:

1. A high speed rotor comprising a shaft having a portion of large diameter thereon and stepped portions of progressively decreased diameters longitudinally outward from said large diameter portion, at least one lamination group on said shaft, and a bond connecting said shaft and said at least one lamination group about the interface of the mating diameters thereof.

2. The rotor of claim 1 wherein a plurality of lamination groups are mounted on said shaft at the large diameter portion and at the stepped portions thereof.

3. The rotor of claim 2 wherein said lamination groups each have inner diameters closely approximating the diameters of the respective portions of said shaft to which they are welded.

4. The rotor of claim 3 having rotor bars extending throughout the length of said lamination groups and into rotor rings mounted on said shaft outwardly of the outer lamination groups, and means for holding said rotor bars to said end rings and said end rings against said outer lamination groups.

5. The method of forming a high speed rotor comprising the steps of mounting a first lamination group on a shaft and electron beam welding the first lamination group at the inner diameter thereof to said shaft.

6. The method of claim 5 including the further steps of mounting more lamination groups on reduced diameter portions of said shaft adjacent said first lamination group and similarly bonding them to the reduced diameter portions.

References Cited

UNITED STATES PATENTS

| | | | |
|---|---|---|---|
| 1,761,587 | 6/1930 | Ringland | 310—211 X |
| 1,798,598 | 3/1931 | Gay | 310—212 |
| 3,164,736 | 1/1965 | Sleeter | 310—211 |
| 3,234,419 | 2/1966 | Picozzi | 310—211 |
| 3,426,229 | 2/1969 | Pannell | 310—265 |

WARREN E. RAY, Primary Examiner

U.S. Cl. X.R.

29—598, 609; 310—217, 262